United States Patent
Zacharias et al.

(10) Patent No.: US 7,944,091 B2
(45) Date of Patent: May 17, 2011

(54) APPARATUS FOR FEEDING ELECTRICAL ENERGY INTO A POWER GRID AND DC VOLTAGE CONVERTER FOR SUCH AN APPARATUS

(75) Inventors: Peter Zacharias, Kassel (DE);
Benjamin Sahan, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 98 days.

(21) Appl. No.: 12/378,913

(22) Filed: Feb. 20, 2009

(65) Prior Publication Data

US 2009/0201706 A1      Aug. 13, 2009

Related U.S. Application Data

(63) Continuation-in-part of application No. PCT/DE2008/000620, filed on Apr. 12, 2008.

(30) Foreign Application Priority Data

Jun. 15, 2007 (DE) .......................... 10 2007 028 078

(51) Int. Cl.
*B23K 11/24* (2006.01)
(52) U.S. Cl. ...................................... 307/112
(58) Field of Classification Search .............. 363/35; 307/109, 112
See application file for complete search history.

(56) References Cited

U.S. PATENT DOCUMENTS 6,275,392 B1 * 8/2001 Streicher et al. ............... 363/35
2007/0047277 A1   3/2007 Konishi et al.

FOREIGN PATENT DOCUMENTS

| DE | 19642522 | 4/1998 |
|---|---|---|
| DE | 19732218 | 3/1999 |
| DE | 11235024 A | 8/1999 |
| DE | 10221592 | 12/2003 |
| DE | 10225020 | 12/2003 |
| DE | 102004030912 | 1/2006 |
| DE | 102004037446 | 6/2006 |

* cited by examiner

*Primary Examiner* — Shawn Riley
(74) *Attorney, Agent, or Firm* — Eschweiler & Associates, LLC

(57) ABSTRACT

The apparatus for feeding electrical energy into a power grid (8) with a DC voltage converter (2) intended for connection to a DC voltage generator (1) and with an inverter (3) connected thereto and intended for connection to a power grid (8), wherein the inverter contains a bipolar voltage intermediate circuit with two capacitors (C1, C2) that are placed in series and are connected together at a ground terminal (E3) intended for connection to a terminal of the DC voltage generator (1). The DC voltage converter (2) comprises at least two diodes (D3, D4), one switch and one storage choke (16) which is charged by the DC voltage generator (1) when the switch is closed and is discharged via the capacitors (C1, C2) and the diodes (D3, D4) when the switch is open. On the one side, the storage choke (16) forms, together with two switches (S3, S4), a first electric circuit intended for charging said storage choke (16), the electric circuit being adapted for connection to the DC voltage generator (1) by closing the switches (S3, S4) and that, on the other side, it lies, together with the two diodes (D3, D4) and the two capacitors (C1, C2), in a second electric circuit intended for simultaneously discharging of the storage choke (16) via both capacitors (C1, C2) and diodes (D3, D4), the second electric circuit being made operative by opening the switches (S3, S4).

18 Claims, 7 Drawing Sheets

APPARATUS FOR FEEDING ELECTRICAL ENERGY INTO A POWER GRID AND DC VOLTAGE CONVERTER FOR SUCH AN APPARATUS

FIELD

The invention relates to an apparatus of the type recited in the preamble of claim 1 and to a DC voltage converter suited therefor.

BACKGROUND

To feed electrical energy generated with DC voltage generators such as photovoltaic or fuel cell plants into an AC grid, in particular into the utility grid (50/60 Hz), various inverters are used. Between the DC voltage generator and the inverter there is mostly provided a DC voltage converter (DC-DC chopper) that serves the purpose of converting the DC voltage supplied by the DC voltage generator into a DC voltage needed by the inverter or adapted thereto.

For different reasons, it is desired to ground one of the outputs of the DC voltage generator. The reason for the desired grounding is on the one side that there are countries which prescribe such grounding. On the other side, different disadvantages arise in operation when grounding is missing. One of the problems encountered is that of the high-frequency leakage currents. Due to inevitable, parasitic capacitances between the DC voltage generator and the ground, considerable equalizing currents creating an intolerable safety risk may occur in case of potential fluctuations so that complex monitoring measures using fault current sensors or the like are needed for contact protection or for establishing the electromagnetic compatibility (EMC) and said equalizing currents can only be securely avoided by grounding. Moreover, it is known that photovoltaic generators behave very differently with respect to degradation, depending on which technology is used to manufacture them. Generators with crystalline and polycrystalline cells or certain thin film modules are preferably grounded with the negative terminal, whilst backside-contact cells are preferably grounded at the positive terminal.

A grounding of the type described, through which the disadvantages mentioned could be avoided, is readily possible using DC voltage converters with transformers which cause the DC voltage side to galvanically separate from the AC voltage side. Irrespective of whether grid transformers or high-frequency transformers are being used, transformers result i.a. in a reduction of efficiency, in parts in considerable weight and overall size and/or in an additional control expense, which is the reason why transformerless voltage converters are in principle preferred. However, the usual topologies of transformerless DC voltage transformers either make the desired grounding impossible to perform since this grounding would lead to a short-circuit of needed switches, capacitances or the like or they result in increased circuit expense and other disadvantages.

Therefore, numerous attempts have been made to avoid the mentioned disadvantages in another way. Circuits are known in particular, which serve the purpose of reducing the undesirable leakage currents (e.g., DE 10 2004 037 466 A1, DE 102 21 592 A1, DE 10 2004 030 912 B3). In these circuits, a solar generator e.g., is operated isolated from the grid in certain phases of internal electrical energy transport. When the solar generator is periodically electrically reconnected to the grid, its parasitic capacitances are only slightly reconverted so that the potential of the solar generator changes with grid frequency, sinusoidally and at a voltage amplitude that corresponds to half the grid voltage. High-frequency currents then form through the low voltage differences of the solar generator between two switching cycles only and through asymmetries during switching. Capacitive leakage currents can thus be strongly minimized but cannot be avoided completely as a matter of principle.

A circuit arrangement is further known (DE 102 25 020 A1), which uses a divided solar generator the center point of which is grounded. As a result, all the parts of the solar generator have a fixed potential and capacitive leakage currents cannot flow in principle. Since the two direct current sources have a different yield, a circuit for compensating the power differences and the voltages is additionally provided. In this proposed circuit, the disadvantage lies in the high voltage differences in the solar generator and at the switches, in the additional losses in the compensation circuit and in the fact that at least four high-frequency pulsed switches are needed.

Besides, circuit arrangements have already been known by means of which a solar generator can be grounded on one side, in spite of the lack of a transformer. As a result, capacitive leakage currents are prevented as a matter of principle. One of these circuit arrangements (DE 196 42 522 C1) however needs five active switches, one or two switches having to switch simultaneously at high frequency and to provide the average output current. With this circuit, which is also referred to as "Flying Inductor", the efficiency is therefore affected by the high number of components participating simultaneously in series in the current flow. Another disadvantage of this circuit is that discontinuous current pulses are impressed upon the grid, which call for a capacitive mains filter which, as inherent to its functional principle, degrades the power factor but also the efficiency of the circuit in the part load range because of its own need for idle power. Although such a capacitive mains filter can be avoided with another known circuit (DE 197 32 218 C1), nine active switches are needed therefor, of which at least two must be switched simultaneously at high frequencies so that the expense in terms of construction is even further increased and both the robustness and the efficiency of the overall apparatus negatively affected. The topology of a Flying Inductor also has the disadvantage that the voltage load of the switches depends on the grid voltage and is sensitive to mains power failures and that it can only be operated in the three-phase mode of operation by three-fold use with the help of three inverters. Irrespective thereof, inverters with current source characteristics are needed, which is undesirable in many cases.

Finally, apparatus are known (US 2007/0047277 A1), which are intended for inverters having a bipolar voltage intermediate circuit containing two series-connected capacitors connected together at a ground terminal. Such type inverters, which are nowadays mainly used for the purposes of interest herein, can be configured as half-bridge inverters in 3-level circuits and at need as inverters for one-phase or three-phase grid supply. In all of these cases, the connection node between the two capacitors forms a ground terminal that is associated with the zero or neutral conductor of the respective grid and is connected therewith.

The DC voltage converter of this known apparatus contains one choke, two diodes and one switch. In this case, the ground terminal of the inverter can be connected to the negative output of the DC voltage generator. This is made possible using a storage choke that is composed of two magnetically coupled coils. The two coils of this storage choke are galvanically connected together at one end in such a manner that on the one side, when the switch is closed, one of the two coils is charged by the DC voltage generator and the other coil via the first coil by virtue of the magnetic coupling and that, on the other side, when the switch is open, the two coils are discharged via a respective one, associated, of the two capacitors and via a diode belonging thereto.

The advantage that this apparatus makes it possible to ground the DC voltage generator with relatively simple means, in particular without any transformer and with only one switch, is offset by the disadvantage that the ground terminal can only be connected to the negative output of the DC voltage converter. Further, this apparatus does not allow for monitoring the ground line leading from the ground terminal to the DC voltage generator with respect to fault currents since, as a matter of principle, operating currents also flow in this ground line.

A circuit with a power storage choke and two switches connected in series therewith is known from JP 11 235024 A1. On the output voltage side, there are provided two diodes in order to decouple the input and the output. A DC-AC converter with a negative and a positive input and a three-phase AC output is used. Grounding is provided neither at the input nor at the output of the DC-AC converter. It is not mentioned whether the DC-AC converter is transformerless. At the output of the DC-DC circuit, there is only provided one single capacitor. Through this circuit, bidirectional operation of a DC-DC converter can be provided.

SUMMARY

In view of this prior art, the technical problem of the invention is to configure the apparatus of the type mentioned herein above, and in particular a DC voltage converter suited therefor, in such a manner that it is possible to ground the DC voltage generator at any terminal and that this can be realized with relatively simple construction means.

The invention allows for grounded operation of the DC voltage generator by using a DC voltage converter which, in the simplest case, only needs one storage choke, two diodes and two switches. As a result, in spite of only slightly increased expense, the advantage is obtained that the DC voltage generator can be grounded almost anywhere.

The invention will be understood better upon reading the exemplary description accompanying the appended drawings wherein

DETAILED DESCRIPTION

Figure 1:
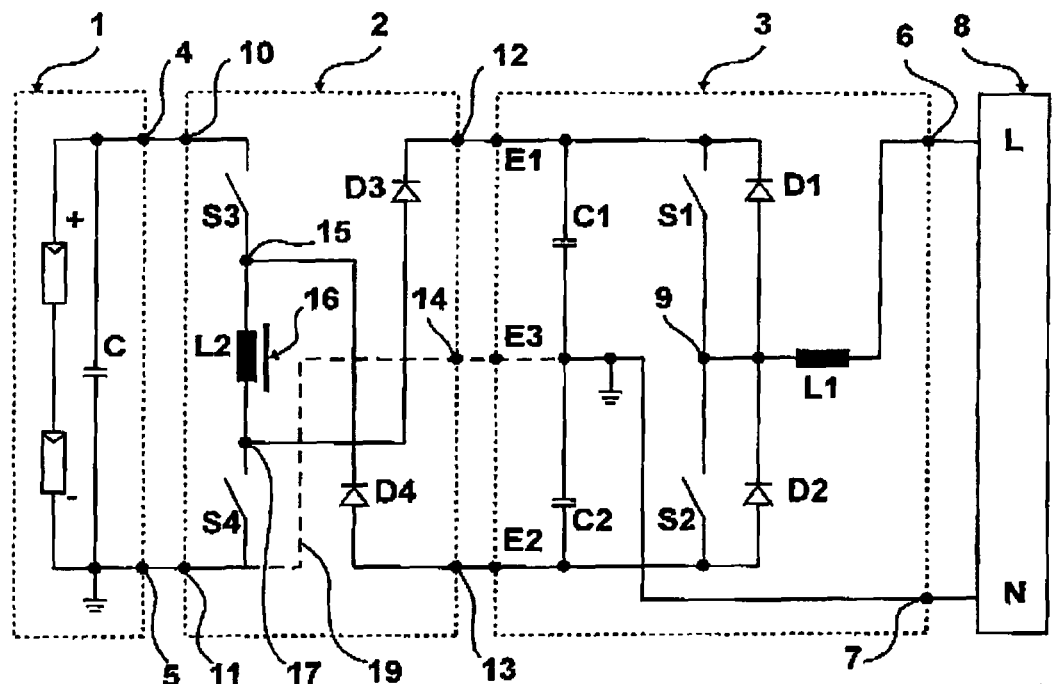
FIG. 1 through 3 show a first exemplary embodiment of an apparatus of the invention for feeding electrical energy into an energy supply system with three different grounding possibilities for a DC voltage generator.

According to FIG. 1, an apparatus for generating electrical energy contains a DC voltage generator 1, a DC voltage converter 2 and an inverter 3. The DC voltage generator 1 consists e.g., of a photovoltaic or fuel cell plant and comprises at the outputs 4 (+) and 5 (−) a capacitor C that is connected in parallel therewith.

A preferred inverter 3 within the scope of the present application comprises two outputs 6 and 7 which serve herein for single phase supply of electrical energy into a grid 8 the phase L of which is connected with the output 6 and the zero or neutral conductor N of which is connected with the output 7. The inverter 3 moreover contains three inputs E1, E2 and E3. Between the inputs E1 and E2, there are disposed two series connected capacitors C1 and C2 the connection node of which lies at the input E3. The capacitors C1 and C2 form a usual bipolar voltage intermediate circuit of the inverter 3. As shown in FIG. 1, the inverter 3 is configured to be a half bridge inverter and is provided for this purpose with two switches S1 and S2 the one terminal of which is respectively connected with a respective one of the inputs E1 and E2 and the other terminal of which leads to a common connection node 9 and from there to the output 6, via a smoothing or grid choke L1. A diode D1, D2 is additionally connected in parallel with a respective one of the two switches S1, S2; the diode D1 can thereby be made conductive from the connection node 9 in the direction of the input E1 and the diode D2 from the input E3 in the direction of the connection node 9, said diodes closing respectively in the opposite direction. Finally, the input E3 is directly connected with the output 7, grounded on the other side and configured to be a ground terminal as a result thereof.

The inverter 3 substantially operates as follows: if the switches S1, S2 are alternately switched on and off, the side (input E1) which is positive with respect to E3 of the capacitor C1 is connected to phase L via the connection node 9 and the grid choke L1 e.g., during the positive half wave of the switch signal (switch S1 at first closed, switch S2 open). When the switch S1 opens next, the current can continue to flow through the grid choke L1, the capacitor C2 and the diode D2. During the negative half wave of the grid 8 (switch S1 open, switch S2 at first closed), the side (input E2) of the capacitor C2, which is negative with respect to E3, is connected to the phase L via the connection node 9 and the choke L1, the current being allowed to continue to flow through the diode D1 and the capacitor C1 after the switch S2 has closed. The two capacitors C1, C2 are discharged alternately as a result thereof, they being recharged in a known way with the help of any suited DC voltage converter.

Apparatus of the type described are generally known (e.g., US 2007/0047277 A1, FIG. 10) and need therefore not be described in detail to those skilled in the art.

Referring to FIG. 1, a DC voltage converter 2 of the invention contains two inputs 10 and 11, which are connected to the two outputs 4 and 5 of the DC voltage generator, as well as three outputs 12, 13 and 14 which are connected to the inputs E1, E2 and E3 of the inverter 3. At the input 10 there is connected a switch S3, which leads to a connection node 15. The one terminal of a storage choke 16 is connected to this connection node 15, the other terminal of said storage choke being located at a connection node 17 that is connected with the input 11 via a second switch S4. Moreover, the connection node 17 is connected to the output 12 via a first diode D3 whilst the output 13 leads to the connection node 15 via a second diode D4. The diode D3 can be made conductive in the direction of the output 12, the diode D4 in the direction of the connection node 15, whilst both are closing in the respective opposite direction. As a result, the functioning principle of the DC voltage converter 2 is as follows:

When the switches S3 and S4 are closed at the same time, the storage choke 16 is recharged by the DC voltage generator 1 or by its capacitor C. The switch S3, the storage choke 16 and the switch S4 form a first series electric circuit that serves for storing electrical energy in the storage choke 16. At this time, the diodes D3 and D4 prevent the current flow to or from the capacitors C1 and C2. If, by contrast, the two switches S3 and S4 are opened simultaneously, the storage choke 16 discharges via the diode D3, the series-connected capacitors C1 and C2 and the diode D4. In this phase, the storage choke 16 forms, together with the parts D3, C1, C2 and D4, a second series electric circuit intended for discharging the storage choke 16 or for accordingly recharging the capacitors C1, C2. If the two capacitors C1, C2 have the same capacitance, they are charged to the same voltage UC1=UC2.

In their opened condition, the voltage load of the switches S3, S4 is relatively small. When the diodes D3 and D4 are conductive, the voltage at the switch S3 is US3=UC+UC2 at the most, wherein UC is the output voltage of the DC voltage generator 1. The voltage at the switch S4, by contrast, is US4=UC1 at the most.

Irrespective thereof, the DC voltage converter 2 described offers the advantage that the DC voltage generator 1 can be operated with a relatively large range of output voltages. If the DC voltage converter 2 were missing, it should be made certain that the DC voltage generator 1 always supplies the inputs E1 and E2, even under unfavourable conditions, with such a high output voltage that the capacitors C1 and C2 are charged to a voltage that is higher than the grid amplitude (usually about ±325 V). If, by contrast, a boost DC voltage converter 2 is provided, the voltages at the capacitors C1, C2 can be set to the desired height by selecting the pulse-duty factor at which the switches S3 and S4 are operated even if the output voltage of the DC voltage generator 1 is lower than the voltage at least needed by the inverter 3 (or by the grid 8).

Further, the apparatus described is very flexible in utilization. This results from the fact that the voltages at C1 and C2 may be both higher and lower than the input voltage at the capacitor C, depending on the selected pulse duty factor for S3 and S4. If the pulse duty factor is more than 0.5, the DC voltage converter operates in the boost mode of operation. If the pulse duty factor is less than 0.5, the DC voltage converter 2 operates in the buck mode of operation. A pulse duty factor of 0.5 practically results in the voltage applied at the output of the DC voltage generator 1 being fed directly. The maximum voltage load of the inverter switches S1 and S2 is about 2·UC1, wherein UC1 is the maximum voltage at the capacitor C1. In the simplest case, it is also possible to always have only one of these switches switched at high-frequency for each half mains period, whilst the other one remains switched off. Moreover, a continuous current flow into the grid 8 is possible on the inverter side.

A major advantage of the invention is finally obtained in that the grounding point E3 can be connected optionally with the input 11 of the DC voltage converter 2 and as a result thereof with the negative output 5 (FIG. 1), with the input 10 of the DC voltage converter 2 and as a result thereof with the positive output 5 (FIG. 2) or with any other terminal 18 (FIG. 3) of the DC voltage generator 1, as this also applies for the neutral conductor N of the grid 8. During normal operation, no current flows through a grounding line 19 (FIG. 1) or 20 (FIG. 2) or 21 (FIG. 3), which is respectively shown in a dashed line and which connects the grounding point E3 with the corresponding input of the DC voltage converter 2 or with the corresponding output of the DC voltage generator 1. This results in particular from the fact that, together with the parts E3, C1, C2 and D4, the storage choke 16 forms an electric circuit, which is closed in itself and does not contain the lines 19, 20 or 21. As a result, it may be concluded that there is a fault in the plant if current still flows in the line 19, 20 or 21.

In accordance with the invention, a monitoring element in the form of a circuit breaker or the like is preferably disposed in the line 19, 20 or 21 for automatically switching off the plant when a preselected tolerable current peak is exceeded. This function is independent on which input of the DC voltage converter 2 or which output of the DC voltage generator 1 the ground terminal E3 is connected to.

In a known way, the switches S1 through S4 are practically configured to be semiconductor switches that may be switched on and off periodically when operated with control units that have not been illustrated herein (microcontrollers, PWM controls and so on), the switch frequency being e.g., 16 kHz or more.

Figure 4:
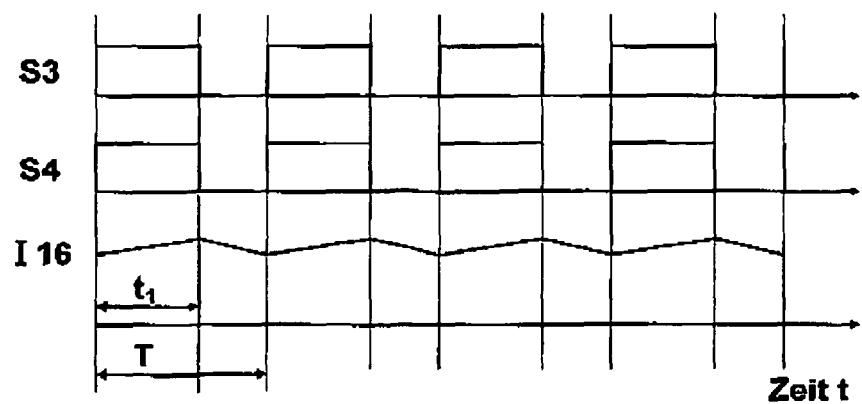
FIG. 4 shows the signals for controlling two switches of the apparatus shown in FIG. 1 through 3 and the current curves resulting therefrom.

The signals for activating the switches S3 and S4 and the current path in the storage choke 16 are illustrated by way of example in FIG. 4. It can be seen therefrom that the two switches S3, S4 are always switched on and off simultaneously.

Figure 2:
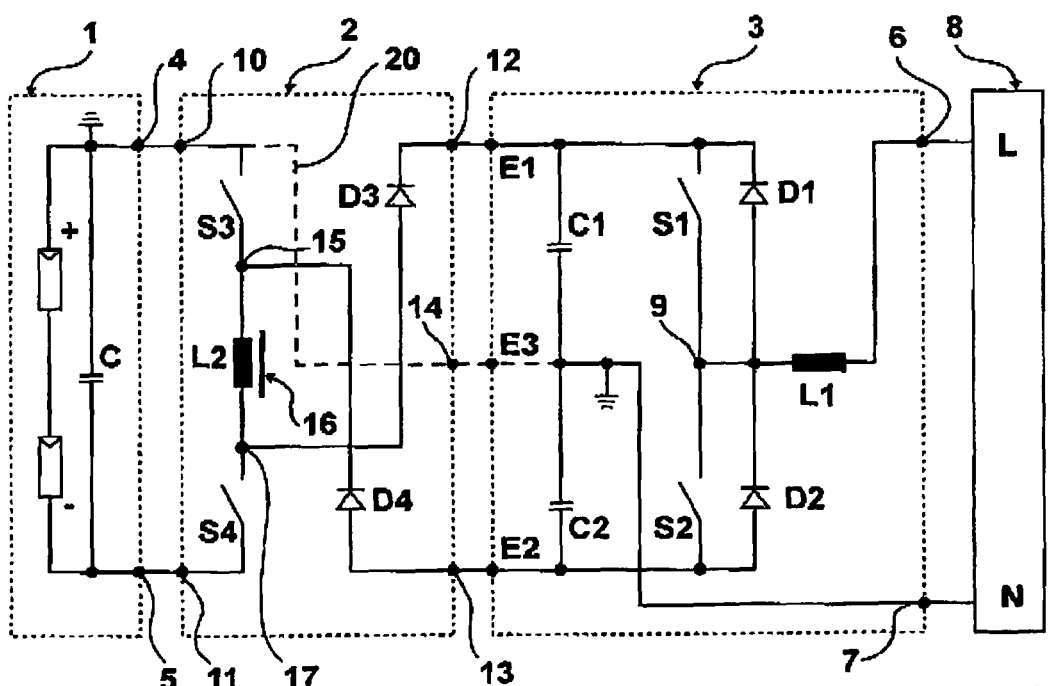
Figure 3:
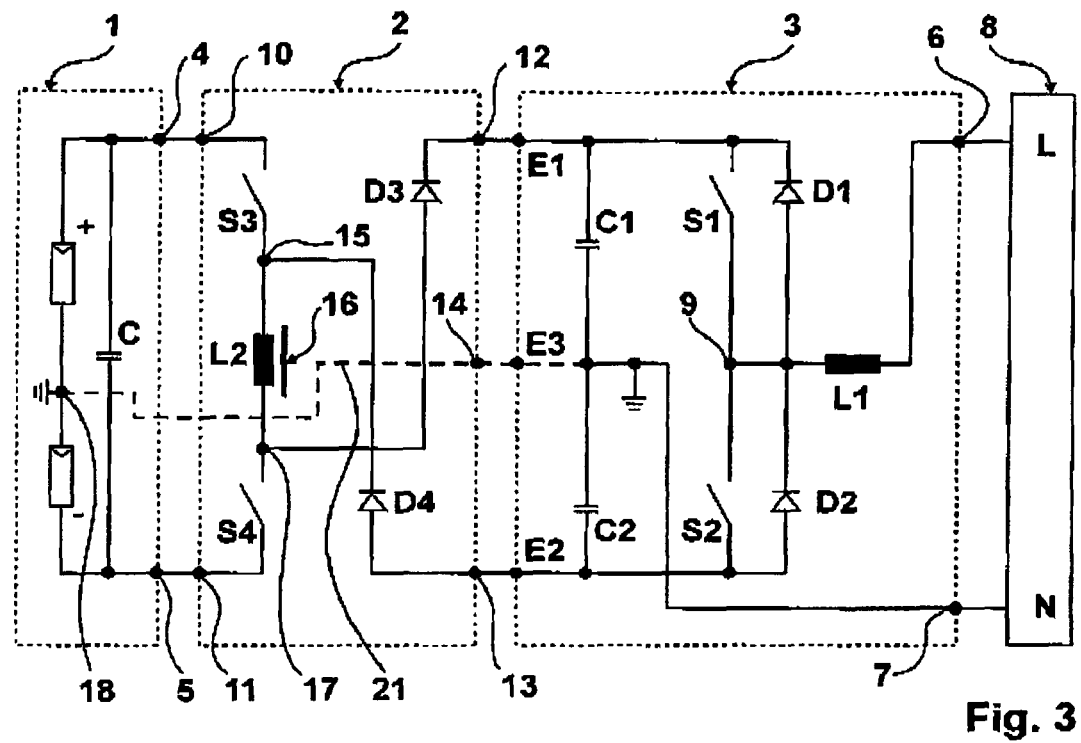
Figure 5:
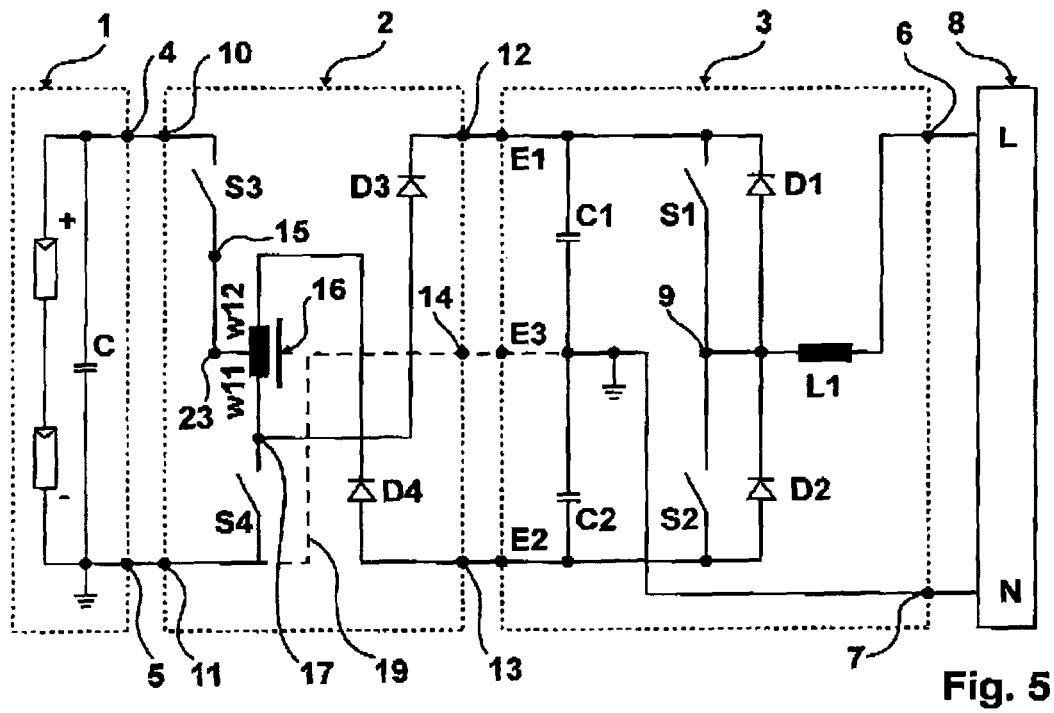
FIG. 5 shows an apparatus as shown in the FIGS. 1 through 3, but with a slightly modified DC voltage converter.

FIG. 5 shows an exemplary embodiment that has been modified over FIG. 1 through 3 insofar as the storage choke 16 is divided into two coil parts W11 and W12 through a central terminal or a coil tap 23. In this case, the arrangement is such that the connection node 15 is connected to the tap 23 and that, as a result thereof, only the part W11 of the storage choke 16, which is fixed by the tap 23, lies in the first electric circuit which serves to charge the storage choke 16, whilst the second electric circuit contains the entire storage choke 16 located between the diodes D4 and D3 or the part W11+W12 thereof. As a result, one may tap another optimization potential of the arrangement of the invention for the relationship between input voltage and output voltage, the load of the switch S3 and the diodes D3 and D4. If the transmission ratio is higher, one has the possibility, beside the pulse duty factor for S3 and S4, to influence the effective current and voltage load of the component parts via the relation (W12+W11):W11. In principle, the location of the tap 23 can be chosen ad lib. A particular advantage of the tap 23 is that the maximum voltage load at the switch S3 in the open condition is only given by the voltage US3=UC+[−n/(n+1)]·UC1+UC2, wherein n=W12/W11 and W11 and W12 simultaneously refer to the number of windings of the coils W11 and W12. The voltage load at the switch S4 is US4=UC1. Alternatively, it is also possible to connect the tap 23 with the switch S4 in analogous fashion. For the rest, the apparatus shown in FIG. 5 corresponds to that shown in the FIGS. 1 through 3, this being the reason why the output 14 of the DC voltage converter 2 may be connected optionally with the output 4 or 5 or with any other output of the DC voltage generator 1.

Figure 6:
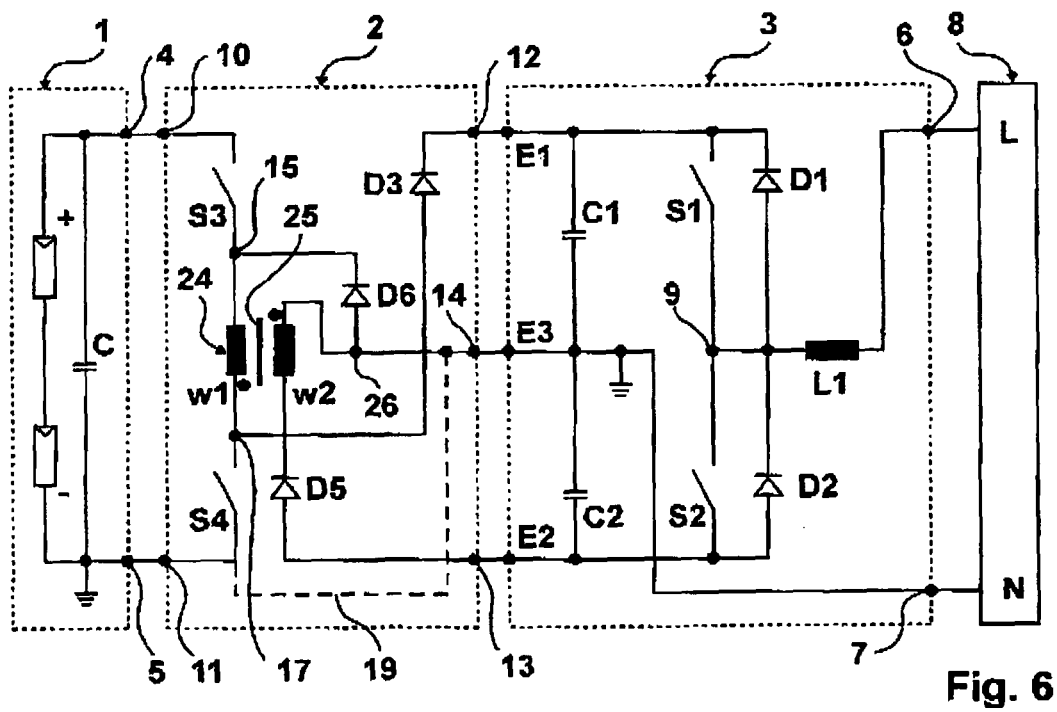
FIGS. 6 and 7 show a second exemplary embodiment of an apparatus of the invention with two different grounding possibilities for a DC voltage generator.
Figure 7:
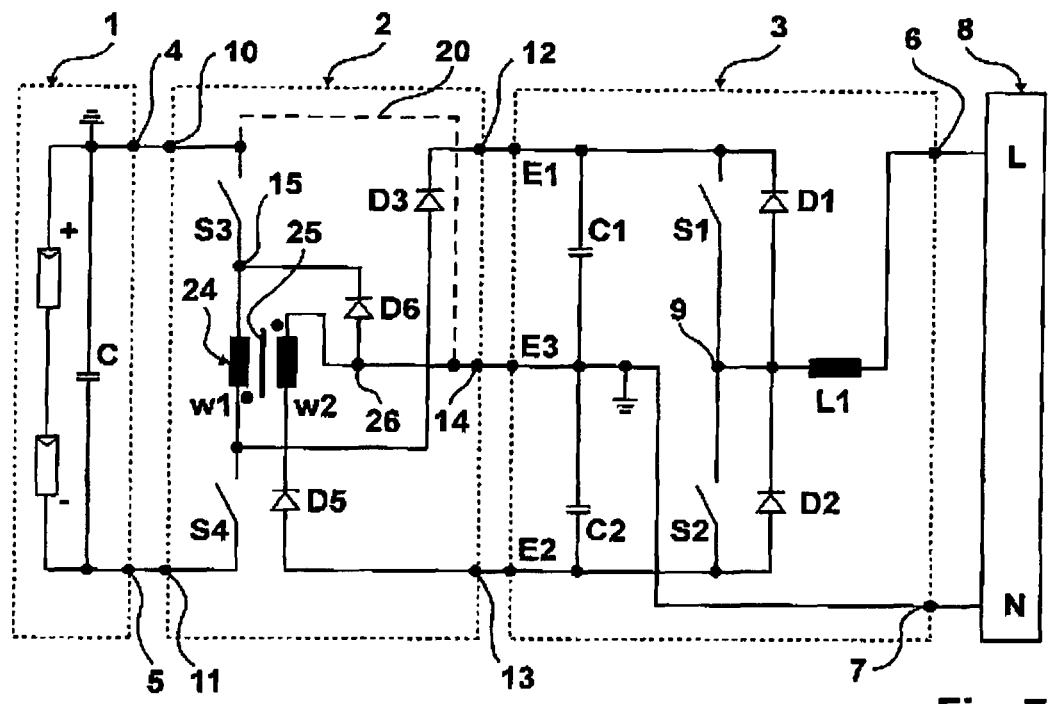

Another exemplary embodiment of the invention is illustrated in the FIGS. 6 and 7. This embodiment differs from the one shown in the FIGS. 1 through 5 in particular in that the advantages described are obtained herein with a coupled storage choke 24, which is known per se but which is electrically connected in a hitherto unknown way. The storage choke 24 contains a first coil W1 and a second one W2 which are magnetically coupled together and are for example wound on a common core 25 for this purpose.

Like the choke coil 16 in FIG. 1, the first coil W1 is electrically interposed between the two switches S3, S4 or between the two connection nodes 15 and 17. Moreover, the connection node 17 is connected to the output 12 via the diode D3 like in FIG. 1. By contrast, the input 13 of the DC voltage converter 2 is connected via a diode D5 to a terminal of the coil W2 the other terminal of which leads to the connection node 15 via a connection node 26 and a diode D6. Moreover, the connection node 26 is connected to the output 14. With this provision, the functioning is as follows:

The first coil W1 of the storage choke 24 forms, together with the two switches S3, S4, a first series electric circuit that is placed in parallel with the outputs 4,5 of the DC voltage generator 1 and serves for charging the coil W1 with electrical energy when the switches S3, S4 are closed. Since the two coils W1, W2 are magnetically coupled, the coil W2 is also charged in this phase via the coil W1. The sense of winding of the two coils W1, W2 is thereby chosen so as to obtain the same voltage polarities at terminals which are shown by dots in FIG. 6.

In the open condition of the switches S3, S4, the two coils W1, W2 lie in a second series electric circuit that leads from one of the terminals of the coil W1 (connection node 17), via the diode D3, the series-mounted capacitors C1 and C2, the diode D5, the coil W2, the connection node 26 and the diode D6 back to the other terminal of the coil W1 (connection node 15). Like in the case shown in FIG. 1, this second electric circuit is an electric circuit that is closed in itself and serves to jointly discharge the coils W1, W2 or to jointly charge the capacitors C1, C2. Moreover, the two coils W1, W2 are galvanically connected together through this electric circuit.

As a result of this arrangement, it is possible to optionally connect the output 14 of the DC voltage converter 2 or the output E3 of the inverter 3 through the line 19 (FIG. 6), or the line 20 (FIG. 7) to the input 11 or 10 of the DC voltage converter 2 and, as a result thereof, also optionally to the output 5 or 4 of the DC voltage generator 1, in order to ground it at the negative output 5 (FIG. 6) or at the positive output 4 (FIG. 7). Moreover, the input E3 could be connected, analogous to FIG. 3, to any central output of the DC voltage generator 1. In all the cases described, these lines 19, 20 and, if applicable, 21 are not in use in normal operation since no current is allowed to flow through these lines 19 through 21 neither during charging nor during discharging of the storage choke 16. As a result, like in the case illustrated in the FIGS. 1 through 5, a still measured current flow in these lines 19 through 21 or between the grounding point E3 and one of the terminals 4, 5 or 18 would be indicative of a fault in the plant or in the DC voltage converter 2 and could be used to switch off the plant.

An advantage of the apparatus shown in FIG. 6 over the apparatus shown in the FIGS. 1 through 3 results from the lower voltage load of the switch S3. Since the diode D6 is conductive during the blocking phase of the switches S3 and S4, the maximum voltage applied at switch S3 is the voltage UC, whilst the voltage UC1 is applied at S4 since the diode D3 is also conductive. In the apparatus shown in FIG. 7, by contrast, the voltage load at the switch S3 is equal to zero and at the switch S4 to UC+UC1.

According to another exemplary embodiment of the invention that has not been illustrated separately the coil W1 of the choke coil 16 can be divided into two parts by a tap, in analogous fashion to FIG. 5. Like in FIG. 5, it is thereby possible to connect the tap to one of the connection nodes 15, 17 while disposing the two coil parts in the second electric circuit. At need, the voltage load of the switch S3 of the exemplary embodiment shown in the FIGS. 6 and 7 is further reduced as a result thereof.

The magnetic coupling of the coils W1, W2 in the FIGS. 6 and 7 is preferably obtained by the fact that they are wound on one common core, above each other or behind each other according to need. Preferably, they have the same number of windings and are practically wound on the core 25 in opposing senses of winding in the arrangement schematically shown in the FIGS. 6 and 7 in order to obtain the right directions of the current flow during charging and discharging.

Figure 8:
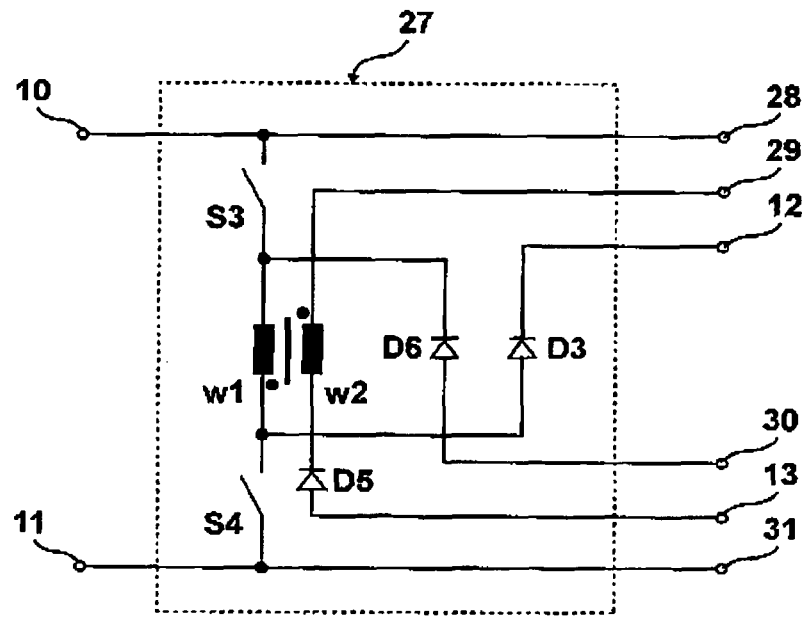
FIG. 8 through 10 schematically show the DC voltage converter shown in the FIGS. 6 and 7 as a component part having a structure that may be selected through plug contacts.
Figure 9:
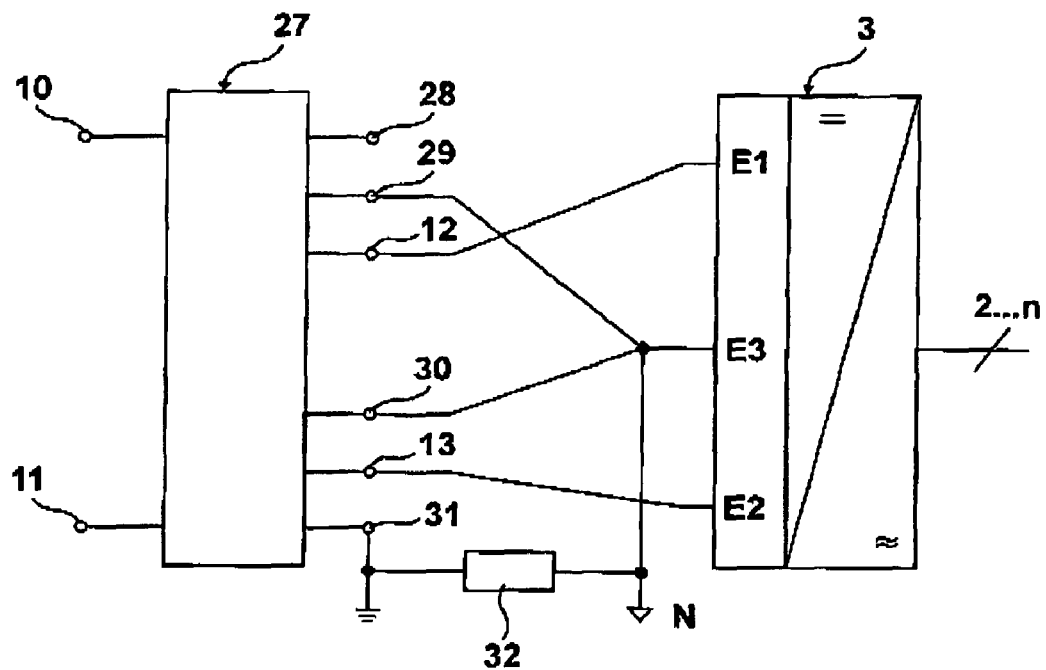
Figure 10:
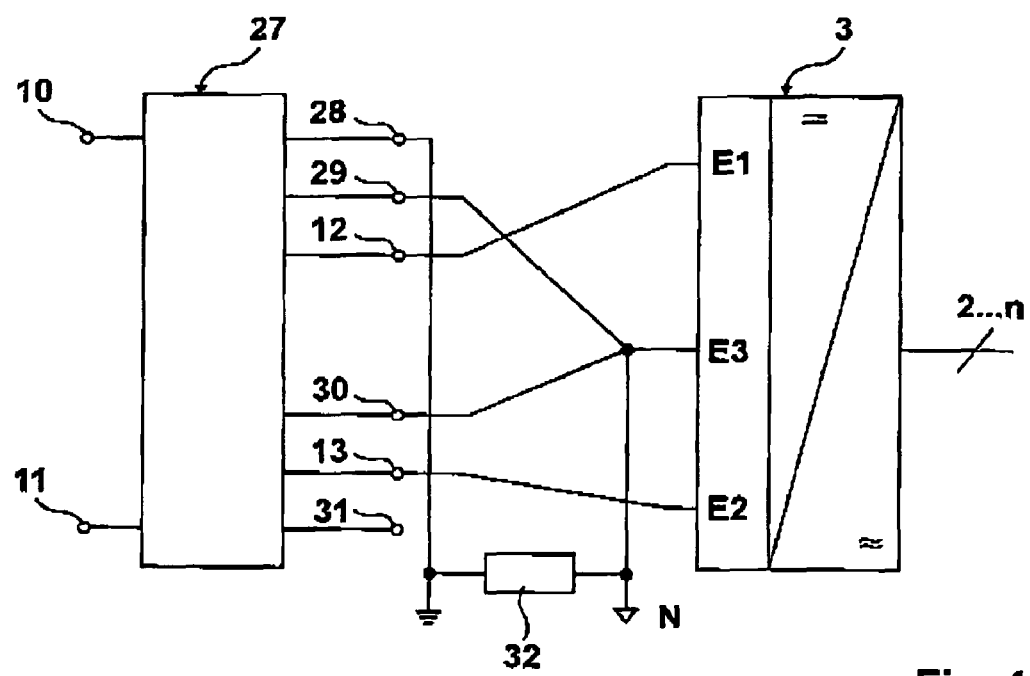

The FIGS. 8 through 10 show how the DC voltage converter 2, herein specially the DC voltage converter 2 shown in the FIGS. 6 and 7, can be configured to be a component part 27 that is provided with a plurality of terminals configured to be plug contacts or the like. As shown in FIG. 8, the DC voltage converter 2 has, unlike in the FIGS. 6 and 7, in addition to the inputs 10, 11 and the outputs 12, 13, four additional outputs 28, 29, 30 and 31 and no output 14. The terminal 28 is directly connected to the input 10, the terminal 31, to input 11. Further, the terminal 29 is connected to the terminal of the coil W2 that is remote from the diode D5 and the terminal 30, to the connection node 26, this terminal not communicating with point 26 in FIG. 8. Through suited connections, the grounding of the DC voltage generator 1 may now be optionally provided at the negative terminal 5 (FIG. 9) or at the positive terminal 4 (FIG. 10).

If grounding is desired to occur at the negative output 5, the terminal 31 is grounded as shown in FIG. 9 and is connected to the input E3 of the inverter 3 and as a result thereof to the neutral conductor N of the grid 8 via a monitoring element 32. Moreover, the terminals 29 and 30 are connected together. As a result, one obtains the arrangement shown in FIG. 6 if, to utilize the component 27, one connects the outputs 4, 5 of the DC voltage generator 1 to its inputs 10 and 11, its outputs 12 and 13 to the inputs E1, E2 of the inverter 3 and its terminals 29, 30 jointly to the input E3 of the inverter 3.

If, by contrast, grounding is desired to occur at the positive output of the DC voltage generator 1, the terminal 28 is grounded as shown in FIG. 10 and is connected to the input E3 of the inverter 3 via the monitoring element 32. The other connections occur like in FIG. 9. By merely re-plugging the terminals 28, 31 of the component part 27 or of the DC voltage converter 2 located therein one has the option to choose to ground the DC voltage generator 1 at the positive or at the negative output 4, 5. Other outputs of the component part 27 could serve to ground also central terminals of the DC voltage generator 1.

The same procedure is followed when using the DC voltage converter shown in the FIGS. 1 through 5.

Figure 11:
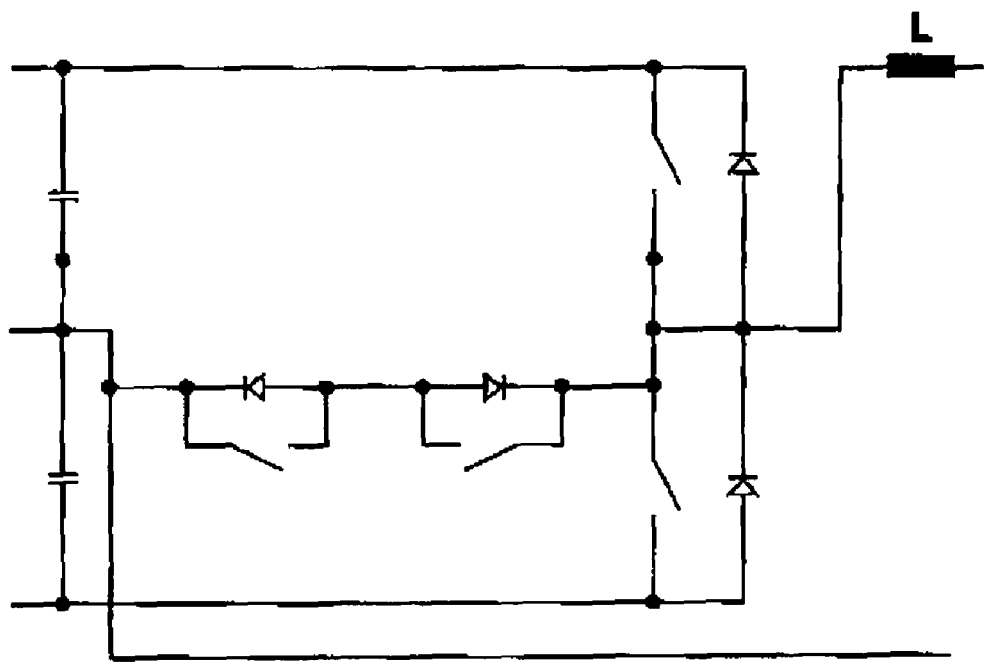
FIG. 11 through 13 different types of inverters, which may be operated with the DC voltage converter of the invention as an alternative to the inverter shown in the FIGS. 1 through 3.
Figure 12:
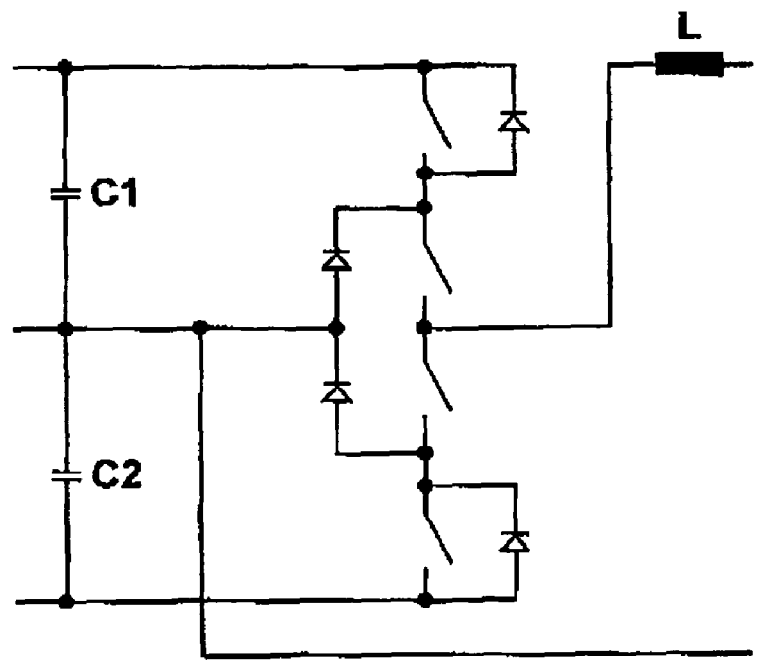
Figure 13:
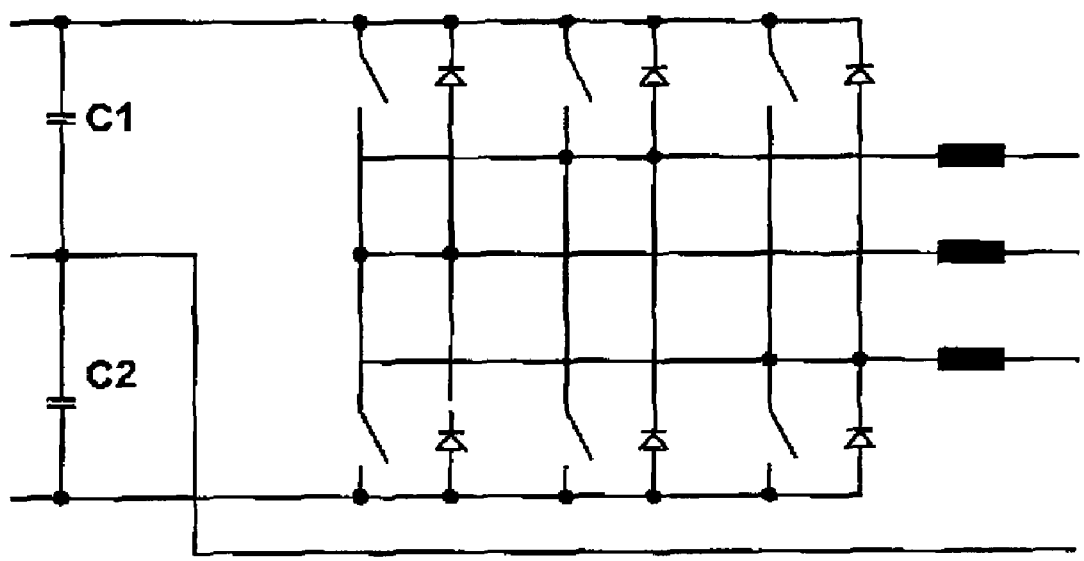

Although the description given herein above only refers to the inverter 3 configured to be a half bridge inverter, it is clear to those skilled in the art that other inverters with a bipolar voltage intermediate circuit can be connected to the DC voltage converter 2 of the invention. This is schematically shown in the FIGS. 11 through 13. FIG. 11 shows a half bridge inverter in a 3-level circuit, FIG. 12 another inverter in a 3-level circuit with center point (each in a single-phase implementation) and FIG. 13 shows an inverter for 3-phase grid 8 supply. All the three inverters have a bipolar voltage intermediate circuit, the inputs E1 through E3 and the outputs 6, 7 correspond to the above description. Since such type inverters are known per se, it seems that they need not be discussed further herein.

The invention is not limited to the exemplary embodiments described, which can be varied in various ways. This applies in particular insofar as the inverters 3 and the DC voltage converters 2 are preferably manufactured and sold as a finished structural unit as shown in the drawings, but they can also be manufactured and sold as separate component parts. The embodiments described referring to the FIGS. 8 through 10 are particularly suited therefor since they make it possible to mass-produce universally utilizable DC voltage converters which are independent on the kind of grounding of the DC voltage converter 1 desired in a particular case. Accordingly, the invention not only relates to the combination of a DC voltage converter 2 and of an inverter 3, but also to the DC voltage converter 2 alone. It is further clear that in the above specification only those component parts were described that are needed to garner an understanding of the invention, and that in particular the required and actually known control units, MPP controls and so on can be additionally provided. Also, it is understood that the various features can also be used in other combinations as those described and illustrated.

The invention claimed is:

1. An apparatus for feeding electrical energy into a power grid, comprising:

a DC voltage converter circuit configured to receive a DC voltage across first and second input terminals and generate a converted DC voltage across first and second output terminals thereof, the DC voltage converter circuit comprising:
   a series connected string coupled across the first and second input terminals of the DC voltage converter circuit, the string comprising a first switch coupled between the first input terminal of the DC voltage converter circuit and a first node coupled to a coil tap of a storage choke, and a second switch coupled between the second input terminal of the DC voltage converter circuit and a second node coupled to a first terminal of the storage choke;
   a first diode coupled between the second node and the first output terminal of the DC voltage converter circuit; and
   a second diode coupled between a second terminal of the storage choke and the second output terminal of the DC voltage converter circuit;
an inverter circuit configured to convert the converted DC voltage received at first and second input terminals thereof from the DC voltage converter circuit to a grid potential at first and second output terminals thereof, the inverter circuit comprising an intermediate circuit comprising first and second series connected capacitors coupled across the first and second input terminals of the inverter circuit, and forming a ground terminal at a connection node therebetween,
wherein the first and second output terminals of the DC voltage converter are coupled to the first and second input terminals of the inverter circuit, respectively, and
wherein the ground terminal of the inverter circuit is coupled to the DC voltage converter circuit.

2. The apparatus of claim 1, wherein the ground terminal of the inverter circuit is coupled to one of the first and second input terminals of the DC voltage converter circuit.

3. The apparatus of claim 1, further comprising a current detector configured to detect current between the ground terminal of the inverter circuit and the DC voltage converter circuit, and generate a ground fault indication if the current exceeds a predetermined value.

4. The apparatus of claim 3, further comprising a circuit breaker configured to discontinue an operation of a system associated therewith in response to the ground fault indication from the current detector.

5. The apparatus of claim 1, wherein the first diode comprises an anode coupled to the second node and a cathode coupled to the first output terminal of the DC voltage converter circuit.

6. The apparatus of claim 1, wherein the second diode comprises an anode coupled to the second output terminal of the DC voltage converter circuit and a cathode coupled to the first node.

7. The apparatus of claim 1, wherein the first and second switches of the DC voltage converter circuit are configured to open and close concurrently.

8. The apparatus of claim 1, wherein the ground terminal of the inverter circuit forms the second output terminal thereof.

9. The apparatus of claim 1, wherein the first node is connected to the second terminal of the storage choke.

10. An apparatus for feeding electrical energy into a power grid, comprising:
   a DC voltage converter circuit configured to receive a DC voltage across first and second input terminals and generate a converted DC voltage across first and second output terminals thereof, the DC voltage converter circuit comprising:
      a series connected string coupled across the first and second input terminals of the DC voltage converter circuit, the string comprising first and second switches and a storage choke comprising first and second coils magnetically coupled together coupled therebetween, wherein the first coil is coupled between the first and second switches at first and second nodes, respectively;
      a first diode coupled between the second node and the first output terminal of the DC voltage converter circuit;
      a second diode having a first terminal coupled to the first node; and
      a third diode having a first terminal coupled to the second output terminal of the DC voltage converter circuit;
   an inverter circuit configured to convert the converted DC voltage received at first and second input terminals thereof from the DC voltage converter circuit to a grid potential at first and second output terminals thereof, the inverter circuit comprising an intermediate circuit comprising first and second series connected capacitors coupled across the first and second input terminals of the inverter circuit, and forming a ground terminal at a connection node therebetween,
   wherein the first and second output terminals of the DC voltage converter are coupled to the first and second input terminals of the inverter circuit, respectively,
   wherein the ground terminal of the inverter circuit is coupled to the DC voltage converter circuit, and
   wherein the second diode has a second terminal coupled to both the ground terminal and a first terminal of the second coil, and wherein the third diode has a second terminal coupled to a second terminal of the second coil.

11. The apparatus of claim 10, wherein the ground terminal of the inverter circuit is coupled to one of the first and second input terminals of the DC voltage converter circuit.

12. The apparatus of claim 10, wherein an anode of the first diode is coupled to the second node and a cathode of the first diode is coupled to the first output terminal of the DC voltage converter circuit.

13. The apparatus of claim 10, wherein an anode of second diode is coupled to the ground terminal, and a cathode of the second diode is coupled to the first node.

14. The apparatus of claim 10, wherein an anode of the third diode is coupled to the second output terminal of the DC voltage converter, and a cathode of the third diode is coupled to the second terminal of the second coil.

15. The apparatus of claim 10, further comprising a current detector configured to detect current between the ground terminal of the inverter circuit and the DC voltage converter circuit, and generate a ground fault indication if the current exceeds a predetermined value.

16. The apparatus of claim 15, further comprising a circuit breaker configured to discontinue an operation of a system associated therewith in response to the ground fault indication from the current detector.

17. The apparatus of claim 10, wherein the first and second switches of the DC voltage converter circuit are configured to open and close concurrently.

18. The apparatus of claim 10, wherein the ground terminal of the inverter circuit forms the second output terminal thereof.

* * * * *